May 27, 1930.  C. L. SNYDER  1,760,089
SHIPPING DEVICE
Filed Feb. 27, 1929
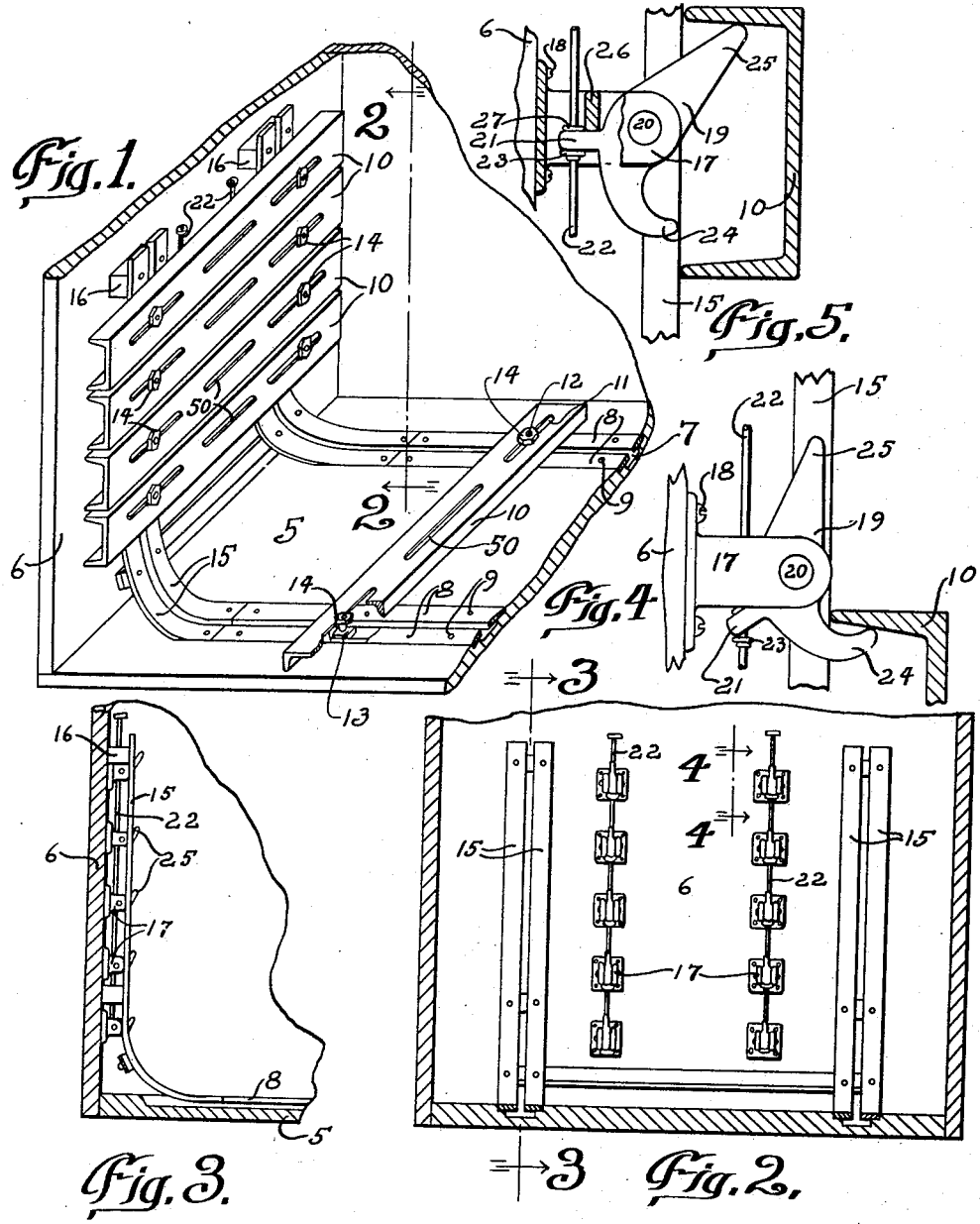
INVENTOR
CLIFFORD L. SNYDER.
BY
Harness, Dickey & Pierce
ATTORNEYS Patented May 27, 1930

1,760,089

UNITED STATES PATENT OFFICE

CLIFFORD L. SNYDER, OF DETROIT, MICHIGAN, ASSIGNOR TO THE EVANS AUTO LOADING CO. INC., A CORPORATION OF DELAWARE

SHIPPING DEVICE

Application filed February 27, 1929. Serial No. 343,089.

It has heretofore been proposed to provide means in the floor of a freight car or the like to which may be secured means for holding a motor vehicle for shipment in the freight car. My invention encompasses such a construction wherein a plurality of movable members are provided for attachment of the vehicle to the freight car and wherein such members are not readily movable from the freight car.

My invention broadly contemplates the provision of means for storing such movable members in the freight car in such manner that they will be instantly available for use, but will be out of the way when it is not desired to use them.

More specifically, my invention contemplates the provision of means provided on a wall of a freight car for holding and storing the movable devices, together with means for moving said devices to the wall storage space without breaking the connection of the devices with the freight car.

With the above and other objects in view, my invention consists in the arrangement, combination and construction of various parts of my improved device as described in the specification, claimed in my claims and shown in the accompanying drawings, in which:

Fig. 1 is a perspective view of a freight car floor and one side and end wall of the car (certain parts being broken away) showing my invention applied thereto.

Fig. 2 is a view taken on line 2—2 of Fig. 1, with the channel cross members of Fig. 1 removed.

Fig. 3 is a sectional view taken on line 3—3 of Fig. 2.

Fig. 4 is a view taken on line 4—4 of Fig. 2.

Fig. 5 is a view similar to Fig. 4, except that a portion of the catch shown in Fig. 4 is in section and the catch is shown in a position opposite to the showing of Fig. 4.

I have shown a floor generally indicated as 5 and an end wall generally indicated as 6. The floor is provided with a pair of spaced longitudinally extending grooves 7, adjacent to each of which are a pair of spaced longitudinally extending plates 8, which are secured to the floor by means of screws, nails or the like generally indicated at 9. The plates 8 combine with the grooves 7 to form a pair of spaced longitudinally extending inverted T slots in the freight car floor. These slots act as guide ways for channel cross members 10 which extend between the slots. The cross members 10 have elongated slots 11 adjacent their ends through which the shanks of bolts 12 extend. The bottom of each bolt 12 may be provided with a head 13 and the top thereof may be provided with a nut 14. Thus, by tightening the nuts 14, the channel cross members may be secured at any desired position along the grooves 7 and by loosening the nuts 14 the channel cross members may be moved to any desired position.

The plates 8 are joined, adjacent one end or both ends of the freight car floor, by similar plates 15, which are curved or bent to extend upwardly parallel with the end wall 6. Blocks 16 may be provided for securing the plates 15 to the end wall of the car and for holding the same spaced from the end wall. When it is not desired to use the cross members 10 for fastening motor vehicles or the like in the freight car, the said members may be moved along the grooves 7 and plates 8 and thence along the plates 15 to be stored against the end wall of the car. In order to removably hold the cross members on the end wall of the car, a plurality of brackets 17 are secured to the end wall by screws 18, each bracket carrying a member generally indicated at 19, said member being pivoted to the bracket as at 20. Each member 19 has an ear 21 at the rear thereof through which a rod 22 extends. The rod 22 has an abutment piece 23 thereon directly beneath each ear 21.

Assuming that it is desired to release one of the cross members 10 from the end wall 6, as shown in Fig. 1, the operator will pull upwardly on the rod 22, thereby moving each of the members 19 on its pivot 20. Assuming that the bottom cross member 10, as shown in Fig. 1, is held by the end 24 of the member 19, such movement will release said member 10, permitting it to fall to the car floor. At the same time, the end 25 of the member 19 will be moved to the position shown in Fig. 5 so as to engage the next member 10 and hold it against falling to the freight car floor. The cross web 26, which is provided on each bracket 17, prevents the member 19 from moving beyond predetermined limits about the pivot 20. When it is desired to release the cross member 10 from the position shown in Fig. 5, the rod 22 is pushed downwardly to engage enlargement 27 with the upper portion of the ear 21, thus rocking the member 19 on its pivot 20 to release the cross member from the end 25 thereof. This movement will automatically move the end 24 of the member 19 to the position shown in Fig. 4 where it engages the next cross member.

It will be understood that I have shown a pair of members 19 at each level, to engage the members 10 and that, while I have described the members 19 as acting singly, they will in fact be moved in pairs to engage and disengage the members 10, a separate rod 22 being provided for each vertical row of the members 19.

Each member 10 is provided with a slot 50 by which a vehicle hold-down or other device for securing vehicles or other freight in the car may be attached thereto.

It will be obvious that various styles or types of guide members for movement of the cross members 10 may be employed without departing from my invention and that any of various types of members for holding the cross members in their stored positions on the end wall of the freight car may be employed.

I have shown herein only one embodiment of my invention and I desire it to be understood that various changes may be made in the arrangement, combination and construction of the various parts of my improved device without departing from the spirit of my invention. It is my intention to cover by my claims such changes as may be reasonably included within the scope of my invention.

What I claim is:

1. In combination, a freight car, a movable member secured thereto, having means for attachment of a shipping device thereto, and means for moving said member back and forth, from a wall to the floor of the car, whereby it may be alternately stored and used, while maintaining it secured to the car.

2. In combination, a freight car, a movable member secured thereto, having means for attachment of a shipping device thereto, and means for moving said member back and forth, from a wall to the floor of the car, whereby it may be alternately stored and used.

3. In combination, a freight car, a movable member secured thereto, having means for attachment of a shipping device thereto, and means for moving said member back and forth, from a wall to the floor of the car, whereby it may be alternately stored and used, while maintaining it secured to the car, and means on the wall of the car for detachably holding said member thereto.

4. In combination, a freight car, a guideway in the car, a member secured to the car and movable along the guideway, said member having means for attachment of a shipping device thereto, and means for moving said member along its guideway to a wall of the car and to the floor thereof, whereby it may be alternately stored and used.

5. In combination, a freight car, a guideway in the car, a member secured to the car and movable along the guideway, said member having means for attachment of a shipping device thereto, and means for moving said member along its guideway to a wall of the car and to the floor thereof, whereby it may be alternately stored and used, while maintaining it secured to the car.

6. In combination, a freight car, a guideway in the car, a member secured to the car and movable along the guideway, said member having means for attachment of a shipping device thereto, and means for moving said member along its guideway to a wall of the car and to the floor thereof, whereby it may be alternately stored and used, while maintaining it secured to the car, said means comprising an extension of the guideway along a wall of the car.

CLIFFORD L. SNYDER.